US012652065B2

(12) United States Patent
Voor

(10) Patent No.: US 12,652,065 B2
(45) Date of Patent: Jun. 9, 2026

(54) SYSTEM, METHOD AND APPARATUS FOR REDUCING INTERFERENCE DURING CONCURRENT WIRELESS ACTIVITY IN COMMON BAND

(71) Applicant: Silicon Laboratories Inc., Austin, TX (US)

(72) Inventor: Thomas Edward Voor, Cedar Park, TX (US)

(73) Assignee: Silicon Laboratories Inc., Austin, TX (US)

( * ) Notice: Subject to any disclaimer, the term of this patent is extended or adjusted under 35 U.S.C. 154(b) by 287 days.

(21) Appl. No.: 18/240,636

(22) Filed: Aug. 31, 2023

(65) Prior Publication Data

US 2025/0080140 A1     Mar. 6, 2025

(51) Int. Cl.
  *H04B 1/00*        (2006.01)
  *H04B 1/40*        (2015.01)
(52) U.S. Cl.
  CPC ............. *H04B 1/0057* (2013.01); *H04B 1/40* (2013.01)
(58) Field of Classification Search
  CPC . H04B 1/401; H04B 1/44; H04B 1/48; H04B 7/04; H04B 1/04; H04B 1/0475; H04B 1/10; H04B 1/1027; H04B 1/3838; H04B 17/336; H04B 2001/0433; H04B 2001/045; H04B 2001/3844; H04B 7/0417; H04B 7/063; H04B 7/0632
  USPC ......................................................... 455/73
  See application file for complete search history.

(56) References Cited

U.S. PATENT DOCUMENTS

| | | | | |
|---|---|---|---|---|
| 2004/0203544 A1* | 10/2004 | Levesque | .............. | H03F 1/0238 |
| | | | | 455/343.1 |
| 2022/0376618 A1* | 11/2022 | Cheng | ................. | H02M 1/0095 |
| 2023/0238994 A1* | 7/2023 | Lin | ...................... | H04B 1/0078 |
| | | | | 455/552.1 |
| 2024/0097350 A1* | 3/2024 | Li | .......................... | H01Q 21/28 |

OTHER PUBLICATIONS

Skyworks Solutions, Inc., "SKY66405-11: 2.4 GHz Front-End Module (FEM) for Zigbee Technology/Thread/Bluetooth® Applications," Jan. 3, 2023, 11 pgs.
Skyworks Solutions, Inc., "SKY85330-11: 2.4 GHz, 256 QAM WLAN Front-End Module," Jan. 4, 2018, 2 pgs.

* cited by examiner

*Primary Examiner* — Ajibola A Akinyemi
(74) *Attorney, Agent, or Firm* — Trop, Pruner & Hu, P.C.

(57)     ABSTRACT

In one embodiment, an apparatus includes: a first radio frequency (RF) circuit to transmit and receive at a 2.4 GHz band according to a first wireless communication protocol; a second RF circuit to transmit and receive at a 2.4 GHz band according to a second wireless communication protocol; and a selection filter coupled to the first RF circuit and the second RF circuit. The selection filter may include: a first filter to couple to the first RF circuit, the first filter configured for a first wireless channel within the 2.4 GHz band; and a second filter to couple to the second RF circuit, the second filter configured for a second wireless channel within the 2.4 GHz band.

20 Claims, 5 Drawing Sheets

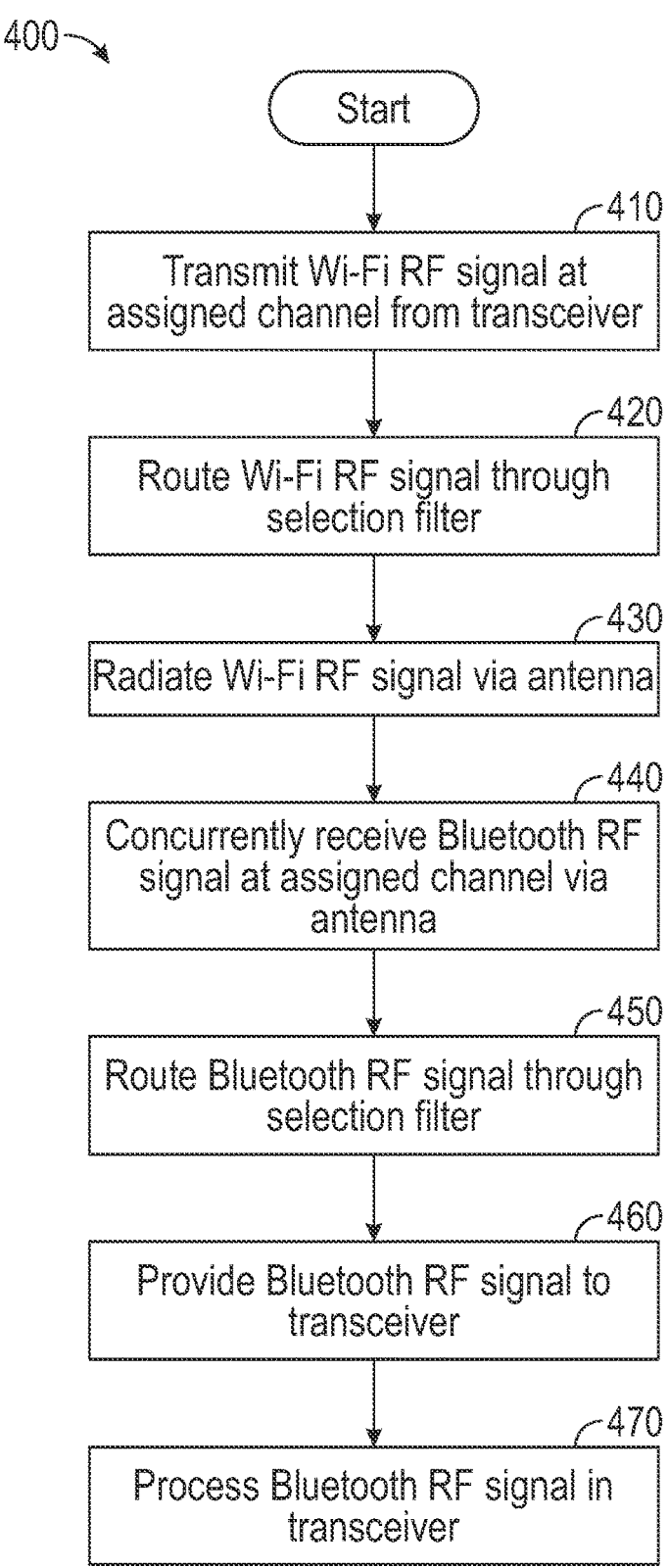

400

Start

410
Transmit Wi-Fi RF signal at assigned channel from transceiver

420
Route Wi-Fi RF signal through selection filter

430
Radiate Wi-Fi RF signal via antenna

440
Concurrently receive Bluetooth RF signal at assigned channel via antenna

450
Route Bluetooth RF signal through selection filter

460
Provide Bluetooth RF signal to transceiver

470
Process Bluetooth RF signal in transceiver

FIG. 4

SYSTEM, METHOD AND APPARATUS FOR REDUCING INTERFERENCE DURING CONCURRENT WIRELESS ACTIVITY IN COMMON BAND

BACKGROUND

Wireless devices are ubiquitous in today's society. Various types of wireless devices can be located in a close area to each other, such that one or more wireless devices can interfere with one or more other wireless devices. This is particularly so, given that various types of devices may communicate at close frequencies using different wireless communication protocols. For example, in the 2.4 Gigahertz (GHz) industrial scientific and medical (ISM) band, a variety of different Wi-Fi devices are available, and they may communicate according to a variety of different wireless communication protocols, e.g., multiple IEEE 802.11 standards. Additional communication protocols operate in this same 2.4 GHz ISM band, including Thread, Zigbee, Bluetooth, or an IEEE 802.15.4 protocol.

Some wireless devices have multiple radio circuits that enable concurrent transmission and reception of radio frequency (RF) signals according to multiple wireless communication protocols. Such devices when transmitting can cause interference when also receiving. One solution to this issue is to increase a receiver's dynamic range, but this can be challenging and costly. Another solution is for the two radios to coordinate function so that they do not operate simultaneously. But this hurts availability on the respective radio networks.

SUMMARY OF INVENTION

In one aspect, an apparatus includes: a first RF circuit to transmit and receive at a 2.4 GHz band according to a first wireless communication protocol; a second RF circuit to transmit and receive at a 2.4 GHz band according to a second wireless communication protocol; and a selection filter coupled to the first RF circuit and the second RF circuit. The selection filter may include: a first filter to couple to the first RF circuit, the first filter configured for a first wireless channel within the 2.4 GHz band; and a second filter to couple to the second RF circuit, the second filter configured for a second wireless channel within the 2.4 GHz band. The first RF circuit and the second RF circuit may be configured to communicate concurrently.

In one implementation, the apparatus further comprises a controller coupled to the selection filter, the controller to configure the first filter for the first wireless channel and to configure the second filter for the second wireless channel. The selection filter may be a triplexer filter comprising a third filter, where the controller is to configure the third filter for a third wireless channel between the first wireless channel and the second wireless channel. The controller may configure the second filter for the second wireless channel based at least in part on a frequency of the first wireless channel.

In an implementation, the apparatus further comprises: a first switch to couple the first RF circuit to the first filter, where the controller is to control the first switch to couple the first RF circuit to the first filter; and a second switch to couple the second RF circuit to the second filter, where the controller is to control the second switch to couple the second RF circuit to the second filter. The apparatus may further comprise at least one other switch, where the controller is to terminate the at least one other switch to a reference voltage node. The selection filter may further comprise a third filter, where the controller is to cause the third filter to be coupled to the first RF circuit.

In an implementation, the apparatus further comprises a first front end circuit coupled between the first RF circuit and the first filter, the first front end circuit comprising a first power amplifier and a first low noise amplifier. The first RF circuit is to transmit a first RF signal of the first wireless channel at a power level less than a threshold when the first front end circuit is present and to transmit the first signal at a power level greater than the threshold when the first front end circuit is not present.

In an implementation, the second RF circuit is to communicate mask information to one or more partner devices to prevent communication within the first wireless channel.

The apparatus may include at least one integrated circuit comprising the first RF circuit and the second RF circuit, where the first RF circuit is to transmit a first RF signal of the first wireless channel concurrently when the second RF circuit is to receive a second RF signal of the second wireless channel. The at least one integrated circuit may be implemented with a first integrated circuit comprising the first RF circuit and a second integrated circuit comprising the second RF circuit. The apparatus may further comprise a directional coupler to provide the controller with feedback information regarding at least the first RF signal.

In another aspect, a method comprises: transmitting, from a first transceiver of a system, a first RF signal within a first wireless channel of a frequency band; routing the first RF signal through at least one switch circuit to at least one segment of a selection filter of the system, the at least one segment configured to substantially cover the first wireless channel; transmitting the filtered first RF signal from an antenna of the system; receiving, via the antenna, a second RF signal within a second wireless channel of the frequency band; and routing the second RF signal to a second segment of the selection filter, the second segment configured for the second wireless channel, and thereafter through a second switch circuit to a second transceiver of the system.

In one implementation, the method further comprises processing the second RF signal in the second transceiver. Transmitting, from the first transceiver, the first RF signal may include transmitting message information comprising status information from the system to a remote system having a user interface, the first RF signal communicated according to an IEEE 802.11 communication protocol; and receiving the second RF signal may include receiving sensed information from a sensor in a low power personal area network with the system, the second RF signal communicated according to a low power wireless communication protocol.

In an implementation, the method further comprises: receiving a channel assignment for the first wireless channel from an access point; configuring the first transceiver for operation within the first wireless channel and configuring a routing path between the transceiver and the at least one segment of the selection filter via the at least one switch circuit; determining the second wireless channel based at least in part on the first wireless channel; and configuring the second transceiver for operation within the second wireless channel and configuring a routing path between the second transceiver and the second segment of the selection filter via the second switch circuit.

In yet another aspect, a system includes: at least one integrated circuit comprising: a first RF circuit to transmit and receive at a 2.4 GHz band according to a first wireless communication protocol; a second RF circuit to transmit and receive at the 2.4 GHz band according to a second wireless communication protocol; and a controller coupled to the first RF circuit and the second RF circuit, the controller to configure a first routing path and a second routing path to enable concurrent transmission by the first RF circuit and reception by the second RF circuit; a multiplexer filter comprising: a first filter configured for a first channel within the 2.4 GHz band; and a second filter configured for a second channel within the 2.4 GHz band; a first switch configurable by the controller to be included in the first routing path to couple the first RF circuit with the first filter; and a second switch configurable by the controller to be included in the second routing path to couple the second RF circuit with the second filter.

In one implementation: the second RF circuit is to receive within a second RF signal low latency information from a capture device in a wireless personal area network with the system; and the first RF circuit is to transmit a first RF signal to a remote device through an access point in a wireless local area network with the system, the first RF signal comprising at least some of the low latency information.

In an implementation, the multiplexer filter further comprises a third filter configured for the second RF circuit, where a desired signal of the second RF circuit is in a transition band between the second filter and the third filter.

BRIEF DESCRIPTION OF THE DRAWINGS

FIG. 4 is a flow diagram of a method in accordance with another embodiment.

DETAILED DESCRIPTION

In various embodiments, a wireless device that communicates according to multiple wireless communication protocols may be configured with circuitry and control techniques to reduce interference when multiple radios are concurrently communicating within a common band. Although embodiments described herein are with regard to multiple communications within a 2.4 GHz ISM band, embodiments are not so limited and are applicable to any wireless bands. In addition, embodiments may be used in connection with communications within separate bands that are near enough to interfere with each other.

The 2.4 GHz ISM band is 80 MHz wide and in typical Wi-Fi arrangements, the band is divided to operate in a 20 MHz channel. In Wi-Fi, these channels typically are enumerated as channel numbers 1, 6, or 11, or channel numbers 1, 5, 9, 13. This spacing between bands exists to reduce interference. In operation, a wireless device seeking to communicate with an access point obtains a channel allocation from the access point, and configures its circuitry to operate at the assigned wireless channel.

At the same time the wireless device is communicating Wi-Fi signals with an access point, it may also seek to communicate with a different device according to one or more other wireless communication protocols in the same 2.4 GHz ISM band. Assume for example that the wireless device is also seeking to communicate with this different device according to a Bluetooth or Zigbee wireless communication protocol. Since communications may occur concurrently in these two protocols, transmissions (especially via Wi-Fi), can interfere with reception of the other protocol.

In one example, a wireless device having multiple radios that operate in the 2.4 GHz band may include a Wi-Fi radio and Zigbee radio (of course, other alternatives are possible, such as Bluetooth radios, as discussed further below). In this example, a Wi-Fi signal transmitted on Channel 1 can impact receipt of a Zigbee signal received at various frequencies. Even when the Zigbee receiver operating frequency is outside of the Wi-Fi operating frequency, without an embodiment the Zigbee receiver may still be prevented from adequately receiving medium strength signals. A major cause of this is that a portion of a strong Wi-Fi transmit signal can reflect off the antenna and return to the Zigbee receiver's input at a level much higher than the desired Zigbee signal.

Figure 1:
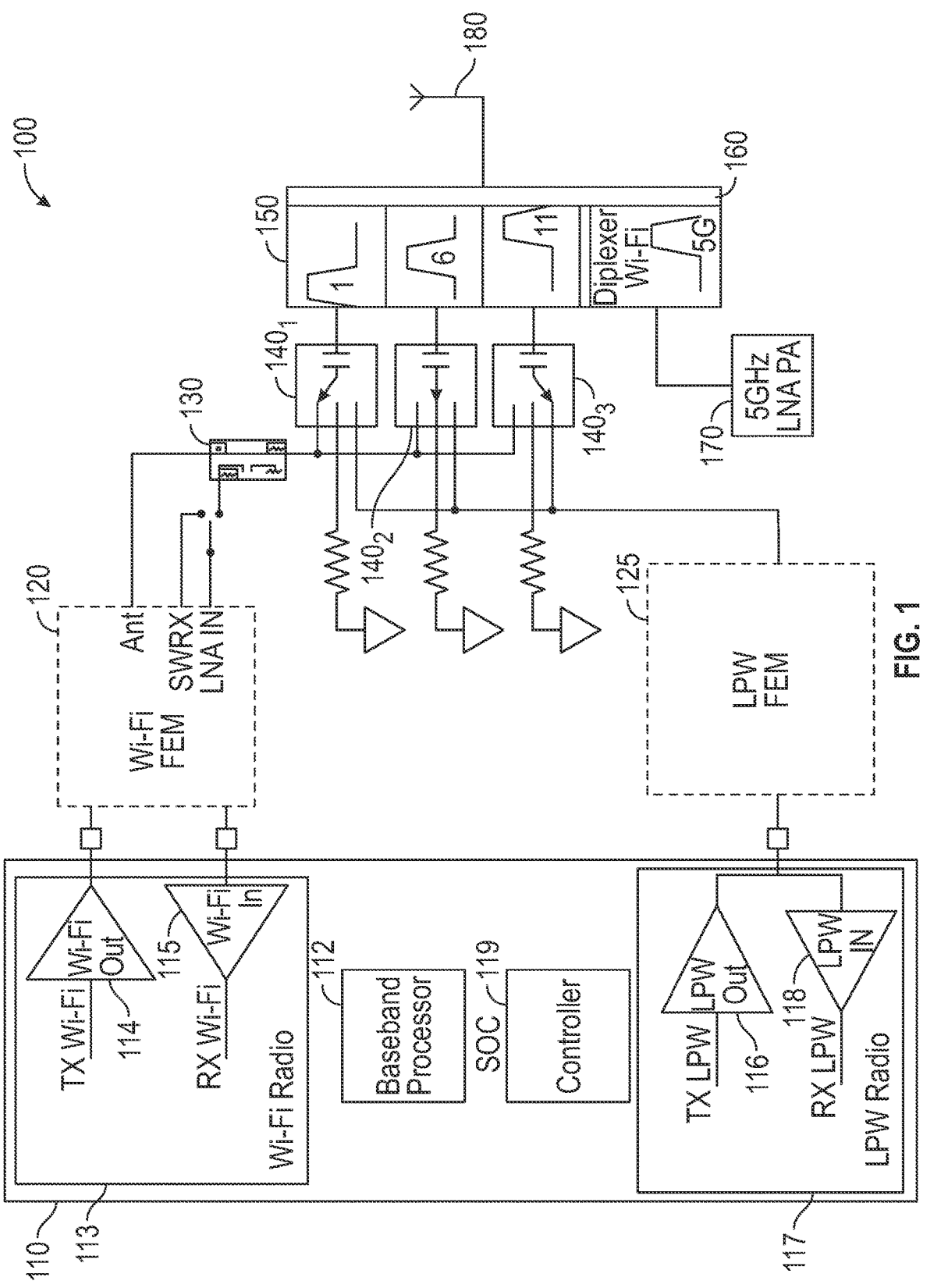
FIG. 1 is a block diagram of a wireless device in accordance with an embodiment.

Referring now to FIG. 1, shown is a block diagram of a wireless device in accordance with an embodiment. Wireless device 100 may be any type of wireless device having dual (or more) radios. For example, wireless device 100 may be implemented as a type of IoT device that can communicate with devices present in one or more networks. As one such example, wireless device 100 can be implemented within a garage door opener or other actuator that communicates with Wi-Fi devices in a Wi-Fi network such as a home network (and devices coupled to the home network via a wide area network), and can also communicate with sensors or other devices via a personal area network (PAN) such as a Zigbee or Bluetooth PAN. One example sensor is a motion sensor that can alert the garage door opener when a person or object is in a line of the garage door.

Understand that whatever the form, wireless device 100 may include one or more integrated circuits, memory, and so forth. In the high level view of FIG. 1, wireless device 100 includes a system on chip (SoC) 110, which may be implemented as an integrated circuit having a single or multiple semiconductor die. SoC 110 includes multiple radio circuits, including a first radio circuit 113, which is shown in the embodiment of FIG. 1 as a Wi-Fi radio. Wi-Fi radio circuit 113 includes various circuitry to process outgoing signals, raising them to RF frequency, amplifying, and outputting these signals, and to process incoming signals.

In the high level shown in FIG. 1, transmit path circuitry is illustrated as a transmitter 114. Understand that such circuitry may include mixing circuitry, filtering circuitry, amplification circuitry and so forth. In some cases, the circuitry may further include a power amplifier (PA). And in the receive direction, receive path circuitry is illustrated as a receiver 115. Understand that in various embodiments, this receive path circuitry may include amplification circuitry, including a low noise amplifier (LNA), filtering circuitry, mixing circuitry to downconvert the RF signals, and so forth. Wi-Fi radio circuit 113 couples to a baseband processor 112, which may perform baseband processing, both to provide outgoing signals to Wi-Fi radio circuit 113 and to receive incoming signals therefrom.

In turn, a second radio circuit 117 is another radio that communicates in a 2.4 GHz band. In the embodiment of FIG. 1, second radio circuit 117 is illustrated as a low power wireless (LPW) radio such as in accordance with a given IEEE 802.15.4 or other specification. In different implementations, this radio may be a Bluetooth, Zigbee, Thread, or other radio. Like Wi-Fi radio circuit 113, LPW radio circuit 117 includes a transmitter 116 and a receiver 118 (which may include similar circuitry as described for Wi-Fi radio circuit 113). LPW radio circuit 117 also couples to baseband processor 112.

As further illustrated, SoC 110 also includes a controller 119. Although controller 119 is shown as a separate component in FIG. 1, it is possible in some implementations for this controller to be included within baseband processor 112 (or as part of a DSP in some implementations). In any event, controller 119 may include either dedicated or programmable hardware circuitry configured to dynamically control components within radios 113, 117 and further to provide control of additional components within wireless device 100. To this end, controller 119 may include or be coupled to a non-volatile storage or other non-transitory storage medium to store instructions and data usable for such operation.

SoC 110 couples to optional front end modules (FEMs) 120, 125. As shown, each module couples to one of radio circuits 113, 117. Although not shown in the high level of the FIG. 1, understand that each FEM may include independent transmitter and receiver circuitry. For example, each FEM may include a PA and an LNA, along with appropriate switching and/or bypass circuitry. When wireless device 100 includes these front end modules, transmitters within radio circuits 113, 117 may be configured to output signals at lower power levels, thus reducing undesired coupling between the radios. Controller 119 may control such output power levels.

With further reference to FIG. 1, front end modules 120, 125 couple through a set of switches $140_{1-3}$ to a selection filter 150. Selection filter 150 is configured under control of controller 119 to provide signal paths between corresponding FEMs (when present) and a given filter within selection filter 150. As also shown, switches 140 can controllably couple to a reference voltage node, e.g., ground, by way of termination resistors. When a given switch 140 is unselected, it is terminated via this ground connection (as shown with respect to switch 1402).

In the embodiment of FIG. 1, an optional directional coupler 130 is coupled between FEM 120 and switches 140. Directional coupler 130 may provide a feedback path to controller 119 (not shown), baseband processor 112, or other location. This feedback information may be used to measure output power, signal quality or so forth. In other examples, directional coupler 130 may be alternately located, such as on a path to an antenna 180.

Still referring to FIG. 1, selection filter 150 may be implemented as a set of Bulk Acoustic Wave (BAW) filters, to provide steep transition bands. Of course, other filter configurations such as temperature-compensated SAW filters, instead may be used. Filter 150 is used to divide the 2.4 GHz ISM band into a plurality of segments. For example, selection filter 150 may be implemented as a diplexer, triplexer or quadplexer to split the band into 3 or 4 segments, respectively. As shown in FIG. 1, selection filter 150 is implemented as a triplexer, splitting the band into three segments (shown as wireless channels 1, 6, and 11). More generally, this filter is a multiplexer filter to split the band into a desired number of segments.

Still further, selection filter 150 acts to reduce the signal strength of a signal output by a given transmitter of wireless device 100 at an input of the adjacent receiver of wireless device 100. With this arrangement, Wi-Fi radio circuit 113 uses one of these filter channels, while LPW radio circuit 117 is free to use the remaining channels.

In various environments, selection filter 150 maybe attenuate signals of the different paths to enable transmit and receive functionality concurrently with a greatest amount of isolation, even with a single antenna present. Selection filter 150 may attenuate Wi-Fi transmit off-channel emissions, reducing interference with a LPW receive channel. In addition, selection filter 150 may attenuate LPW transmit off-channel emissions, reducing interference with a Wi-Fi channel. Still further, with an included Channel 1 filter, Wi-Fi out-of-band emissions while operating on edge channels can be reduced, enabling an increase in Wi-Fi transmit power on Channel 1. Selection filter 150 also may be configured to attenuate cellular blockers on nearby LTE bands.

Still with reference to FIG. 1, selection filter 150 couples to antenna 180. Although a single antenna is shown for ease of illustration in FIG. 1, there may be multiple antennas present, such as in a diversity antenna configuration. With a single antenna, transmit and receive signals of both Wi-Fi radio circuit 113 and LPW radio circuit 117 couple to antenna 180. These signals, which can be concurrently communicated, may be a source of interference for the adjacent radio, as discussed.

Still with reference to FIG. 1 a diplexer 160 also may couple to antenna 180 to provide a path for 5 GHz wireless signals with a transceiver 170. As shown, transceiver 170 includes a PA and receiver circuitry, including a LNA.

Embodiments may further provide coordination between the radio systems so that LPW radio circuit 117, and the network devices communicating to it, avoid using frequencies at which Wi-Fi radio circuit 113 is operating. In typical use cases, the Wi-Fi frequency is normally assigned by a distant Wi-Fi access point. Depending on implementation, Wi-Fi radio circuit 113 provides this information to controller 119 and/or directly to LPW radio circuit 117, which in turn masks off the assigned Wi-Fi frequencies to the devices with which it communicates. To this end, LPW radio circuit 117 is configured to communicate mask information to such devices to inform regarding the masked-off wireless channels. The remote devices may be able to use the masked-off Wi-Fi frequencies to communicate to other devices in their networks.

In one or more embodiments, to provide greater flexibility of operating frequencies between multiple radios operating in the 2.4 GHz band, LPW radio circuit 117 may be configured to operate at frequencies in between the discrete frequencies of selection filter 150.

To this end, switches 140 may be configured such that two filter segments couple to LPW radio circuit 117. For example, controller 119 may configure channel 1 to couple to Wi-Fi radio circuit 113. In turn, LPW radio circuit 117 is configured to communicate at a channel between Wi-Fi channels 6 and 11 (e.g., Zigbee wireless channels 20+).

When controlling switches 140 for dual filter segments, there may be some amount of distortion of a Wi-Fi TX signal and the LPW signal due to this combination of filter segments. Embodiments may re-level the respective signals to correct them. More specifically, feedback via directional coupler 130 (when it is in the alternate position between the antenna 180 and multiplexer 160) may be used to identify such distortion. Controller 119 may be configured to identify this distortion and control Wi-Fi radio circuit 113 and baseband processor 112 digitally to reduce the distortion. This same technique may be done for the LPW signals from LPW radio circuit 117 using the same integrated baseband processor 112.

Selection filter 150 and its configuration may thus increase isolation between Wi-Fi radio circuit 113 and LPW radio circuit 117, to allow its receiver to operate while the transmitter of Wi-Fi radio circuit 113 is transmitting.

Embodiments thus allow a receiver to receive weak signals while the other radio is simultaneously transmitting at high power on nearby but off channel frequencies. In a particular embodiment, selection filter 150 may reduce a Wi-Fi TX signal level at the Zigbee receiver input sufficiently, so that the Zigbee receiver can receive weak signals almost as normally as when there is no strong Wi-Fi blocker. Although shown at this high level in the embodiment of FIG. 1, many variations and alternatives are possible.

Figure 2:
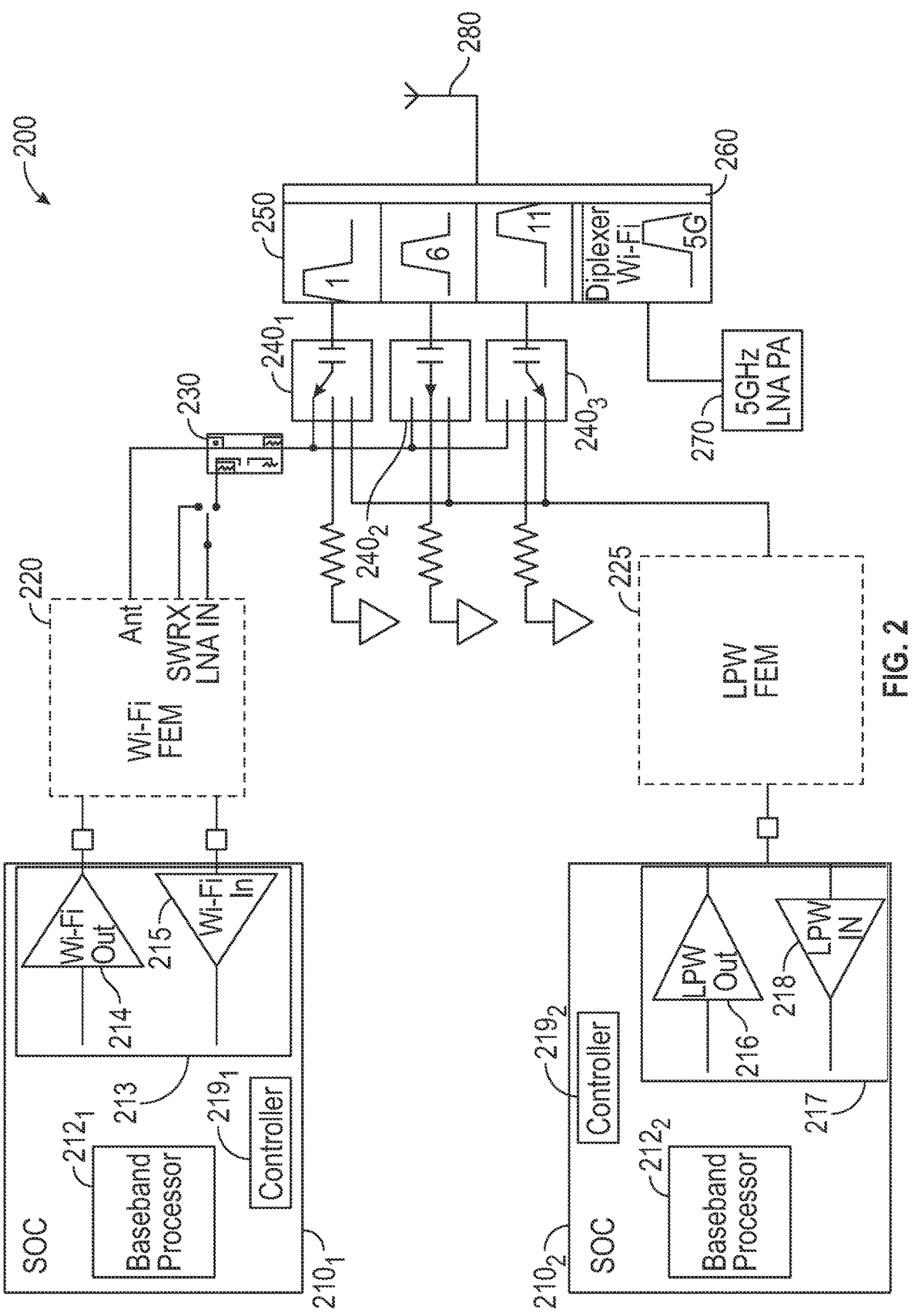
FIG. 2 is a block diagram of a wireless device in accordance with another embodiment.

Referring now to FIG. 2, shown is a block diagram of a wireless device in accordance with another embodiment. As shown in FIG. 2, wireless device 200 is of the same general form as wireless device 100 of FIG. 1 (with common reference numerals, albeit of the "200" series"), and thus common components are not discussed further.

In the embodiment of FIG. 2, wireless device includes multiple SoCs 2101, 2, each with a single RF circuit. In this way, on-chip interference between the RF circuits can be reduced. As illustrated in FIG. 2, wireless device 200 includes a first SoC 2101 and a second SoC 2102. In other respects, wireless device 200 may be configured similarly to wireless device 100 of FIG. 1. Inter-processor communication can be used to coordinate frequency of operation for the two networks, and selection of switches 240.

Figure 3:
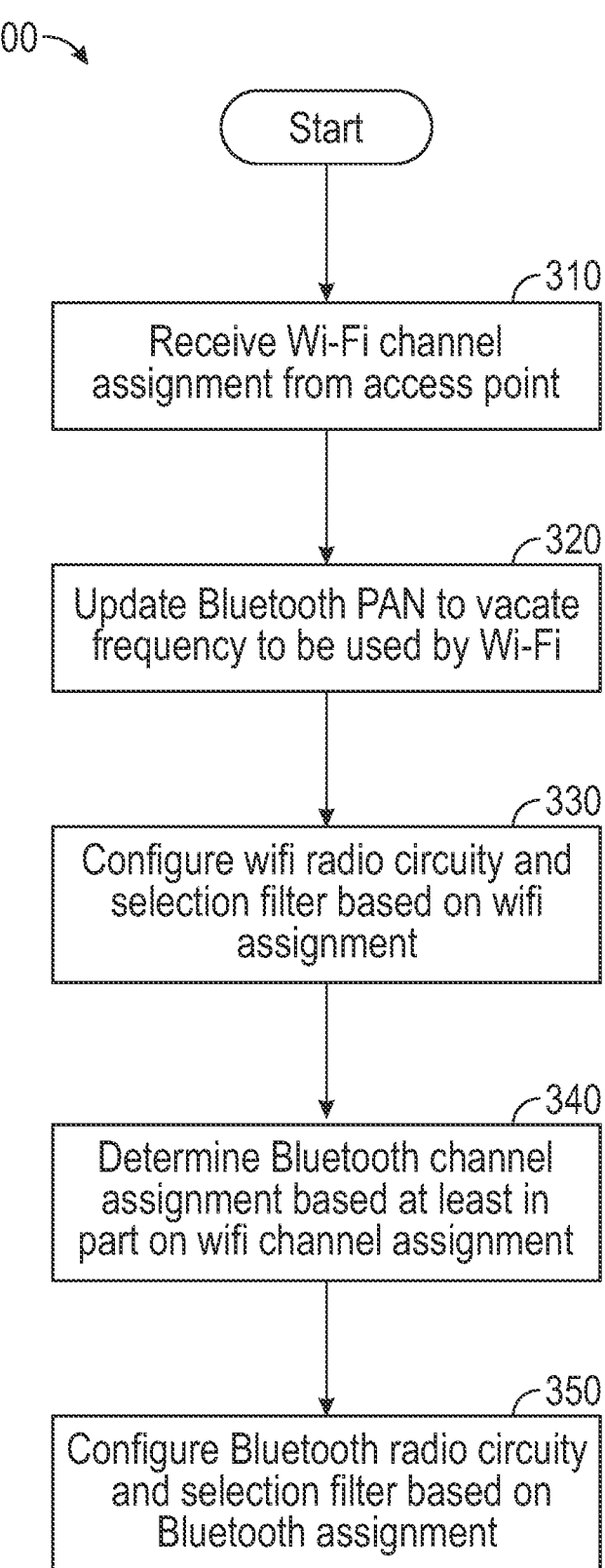
FIG. 3 is a flow diagram of a method in accordance with an embodiment.

Referring now to FIG. 3, shown is a flow diagram of a method in accordance with an embodiment. More specifically, method 300 is a method for configuring a wireless device to enable concurrent communication with multiple channels of the 2.4 GHz band. As such, method 300 may be performed by a controller of the wireless device (in combination with the controlled RF circuits of the wireless device). Although embodiments are not limited in this regard, the controller may be implemented as a microcontroller or other programmable logic of a wireless device, alone and/or in combination with firmware and/or software. Note that while the embodiment of FIG. 3 assumes presence of Wi-Fi and Bluetooth radios, other combinations of 2.4 GHz radios may exist.

As illustrated, method 300 begins by receiving a Wi-Fi channel assignment from an access point (block 310). This channel assignment may be a given Wi-Fi channel within the 2.4 GHz band. Next at block 320, a Bluetooth PAN may be updated to vacate the frequency to be used by the Wi-Fi channel. For example, assume that the channel assignment is for Wi-Fi channel 1. In this instance, the Bluetooth PAN may be instructed to avoid use of any frequency within this Wi-Fi channel. To effect this update, the Bluetooth radio may communicate a notification message to other Bluetooth devices in the PAN to prevent communication at any interfering channels. Thus if the device is currently configured for operation within a Bluetooth channel that co-exists with the assigned Wi-Fi channel, this notification message may cause an update to the active Bluetooth channel.

Still referring to FIG. 3, next at block 330 the controller may configure the Wi-Fi radio circuitry and the selection filter based on the Wi-Fi assignment. To this end, the controller may communicate information and/or control signals to the Wi-Fi radio circuit to cause it to control its circuitry to operate at the appropriate frequency (e.g., LO signals, mixing signals and so forth). Also the controller may configure a routing path from the Wi-Fi radio circuit to the selection filter, namely through a particular switch, to couple the Wi-Fi radio circuit with the appropriate filter segment within the selection filter for the assigned channel. In certain cases, the selection filter itself may dynamically be configured based on the channel assignment. In other cases, the individual filter segments within the selection filter may be fixed, and control through the appropriate switch may be the sole configuration operation needed to enable Wi-Fi signals of the assigned wireless channel to be coupled to the appropriate filter segment.

Still referring to FIG. 3, next at block 340 the controller determines a Bluetooth channel assignment based at least in part on the Wi-Fi channel assignment. More specifically, the controller can select the Bluetooth channel to be separated by at least a predetermined amount from the Wi-Fi channel. For example, there may be a spacing of at least 15 MHz between the Wi-Fi channel and the Bluetooth channel. Finally at block 350, the controller may configure the Bluetooth radio circuitry and the selection filter based on the Bluetooth assignment. As discussed above, the controller may communicate information and/or control signals to the Bluetooth radio circuit to configure it for operation at the appropriate frequency, and configure a routing path from the Bluetooth radio circuit to the selection filter.

Referring now to FIG. 4, shown is a flow diagram of a method in accordance with another embodiment. More specifically, method 400 is a method for concurrently communicating on multiple channels of the 2.4 GHz band via a wireless device. As such, method 400 may be performed by a hardware circuitry of the wireless device alone, and/or in combination with firmware and/or software.

Method 400 begins at block 410, where a Wi-Fi RF signal is transmitted at the assigned channel from a Wi-Fi transceiver. This signal is routed through the selection filter (block 420), via one or more of these switches that couple the Wi-Fi RF circuit with the selection filter (and corresponding FEM, if present). Next at block 430 the Wi-Fi RF signal is radiated via the antenna. Assume for purposes of discussion that a single antenna is used for both Wi-Fi and Bluetooth communications; of course in other implementations there may be separate antennas for these different communication protocols and/or multiple diversity antennas.

Still referring to FIG. 4, at block 440 a Bluetooth RF signal is concurrently received at its assigned channel via the antenna. Note in this regard that while FIG. 4 shows a linear flow of steps, operation is not limited in this regard, and various Wi-Fi and Bluetooth communications may occur in any order concurrently with each other.

This incoming Bluetooth RF signal is routed through the selection filter (block 450), and through one, or two, of the switches that couple the selection filter (and corresponding FEM, if present), and is provided to a Bluetooth transceiver (block 460). It is the above filter which significantly reduces the level of the Wi-Fi transmit signal as seen by the Bluetooth receiver. Next at block 470, the incoming Bluetooth RF signal is processed within the transceiver. By way of the selectivity provided by the selection filter and the separation of frequencies, this incoming Bluetooth RF signal may be received with reduced interference caused by the Wi-Fi blocker. Although shown at this high level in the embodiment of FIG. 4, many variations and alternatives are possible.

Figure 5:
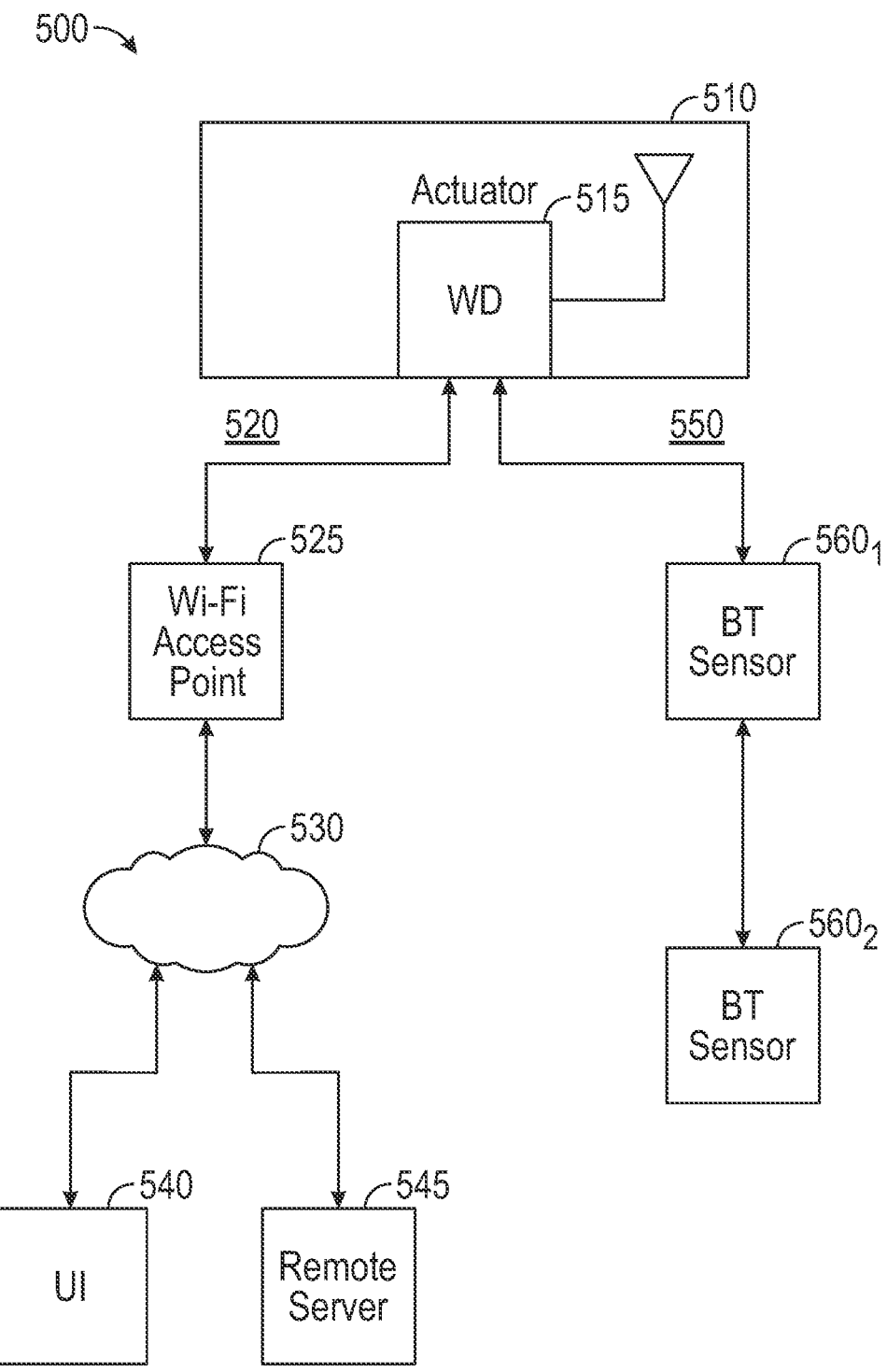
FIG. 5 is a block diagram of an environment in accordance with an embodiment.

Referring now to FIG. 5, shown is a block diagram of an environment in accordance with an embodiment. As shown in FIG. 5, environment 500 includes a system 510, which as shown is implemented as an actuator. As one such example, system 510 may be a garage door opener. Along with various motors or other actuators to raise and lower a garage door, system 510 includes a wireless device 515. Wireless device 515 may be an implementation of wireless devices 100 or 200 discussed above having multiple RF transceivers to enable wireless communication in at least a 2.4 GHz band.

To this end, wireless device 515 may communicate with a first network 520, namely a Wi-Fi network having an access point 525. Access point 525 may assign a given Wi-Fi channel within which wireless device 515 is to communicate. As shown, access point 525 in turn couples to remote devices, shown in FIG. 5 as a user device 540 having a user interface (UI), e.g., a smartphone, tablet, notebook computer or so forth, and a remote server 545. As illustrated, access point 525 may communicate with these devices via a network 530, e.g., the Internet.

Wireless device 515 also may communicate with a second network 550, namely a Bluetooth PAN including sensors 560$_{1,2}$, and which may be configured within a mesh network. After the assignment of the Wi-Fi channel, wireless device 515 may cause sensors 560 to communicate within a different wireless channel and may mask the Wi-Fi channel off, to prevent it from being used within the Bluetooth PAN.

As one example communication flow, assume a user at a remote location seeks to ascertain still or video information of an environment around system 510. This information may be provided first by communicating sensed information from one or more of sensors 560 (or other capture device) via network 550 to wireless device 515. Thereafter, wireless device 515 may transmit at least some of the information through access point 525 and along to user device 540.

In a case in which at least one of sensors 560 is a motion sensor, any detected movement around an open garage door may be communicated to wireless device 515 for use within system 510, e.g., to prevent a garage door closing, or stopping an active door close operation. Of course, many other use cases for wireless devices providing for dual concurrent radio communications are possible. Examples include any of a cell phone, laptop, or tablet using Wi-Fi for internet connection while also communicating via Bluetooth to other devices like speakers and headsets, such as during a video conference call. Understand while shown at this high level in the embodiment of FIG. 5, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a first radio frequency (RF) circuit to transmit and receive at a 2.4 GHz band according to a first wireless communication protocol;
a second RF circuit to transmit and receive at the 2.4 GHz band according to a second wireless communication protocol; and
a selection filter coupled to the first RF circuit and the second RF circuit to divide the 2.4 GHz band into a plurality of segments, wherein the selection filter comprises:
a first filter to couple to the first RF circuit, the first filter configured for a first wireless channel of a first segment within the 2.4 GHz band; and
a second filter to couple to the second RF circuit, the second filter configured for a second wireless channel of a second segment within the 2.4 GHz band, wherein the first RF circuit and the second RF circuit are to communicate concurrently, and the first filter is to filter a transmission of the first wireless communication protocol via the first RF circuit during a reception of the second wireless communication protocol via the second RF circuit.

2. The apparatus of claim 1, further comprising a controller coupled to the selection filter, the controller to configure the first filter for the first wireless channel and to configure the second filter for the second wireless channel.

3. The apparatus of claim 2, wherein the selection filter comprises a triplexer filter comprising a third filter, wherein the controller is to configure the third filter for a third wireless channel between the first wireless channel and the second wireless channel.

4. The apparatus of claim 2, wherein the controller is to configure the second filter for the second wireless channel based at least in part on a frequency of the first wireless channel.

5. The apparatus of claim 2, further comprising:
a first switch to couple the first RF circuit to the first filter, wherein the controller is to control the first switch to couple the first RF circuit to the first filter; and
a second switch to couple the second RF circuit to the second filter, wherein the controller is to control the second switch to couple the second RF circuit to the second filter.

6. The apparatus of claim 5, further comprising at least one other switch, wherein the controller is to terminate the at least one other switch to a reference voltage node.

7. The apparatus of claim 2, wherein the selection filter further comprises a third filter, wherein the controller is to cause the third filter to be coupled to the first RF circuit.

8. The apparatus of claim 1, further comprising a first front end circuit coupled between the first RF circuit and the first filter, the first front end circuit comprising a first power amplifier and a first low noise amplifier.

9. The apparatus of claim 8, wherein the first RF circuit is to transmit a first RF signal of the first wireless channel at a power level less than a threshold when the first front end circuit is present and to transmit the first RF signal at a power level greater than the threshold when the first front end circuit is not present.

10. The apparatus of claim 1, wherein the second RF circuit is to communicate mask information to one or more partner devices to prevent communication within the first wireless channel.

11. The apparatus of claim 1, wherein the apparatus comprises at least one integrated circuit, the at least one integrated circuit comprising the first RF circuit and the second RF circuit, wherein the first RF circuit is to transmit a first RF signal of the first wireless channel concurrently when the second RF circuit is to receive a second RF signal of the second wireless channel.

12. The apparatus of claim 11, wherein the at least one integrated circuit comprises:
a first integrated circuit comprising the first RF circuit; and
second integrated circuit comprising the second RF circuit.

13. The apparatus of claim 11, further comprising a directional coupler to provide a controller with feedback information regarding at least the first RF signal.

14. A method comprising:
transmitting, from a first transceiver of a system, a first radio frequency (RF) signal within a first wireless channel of a frequency band;
routing the first RF signal through at least one switch circuit to at least one segment of a selection filter of the system, the at least one segment configured to substantially cover the first wireless channel, the selection filter to divide the frequency band into a plurality of segments;

transmitting the filtered first RF signal from an antenna of the system;

receiving, via the antenna, a second RF signal within a second wireless channel of the frequency band concurrently with transmitting the filtered first RF signal; and routing the second RF signal to a second segment of the selection filter, the second segment configured for the second wireless channel, and thereafter through a second switch circuit to a second transceiver of the system.

15. The method of claim 14, further comprising processing the second RF signal in the second transceiver.

16. The method of claim 14, wherein:

transmitting, from the first transceiver, the first RF signal comprises transmitting message information comprising status information from the system to a remote system having a user interface, the first RF signal communicated according to an IEEE 802.11 communication protocol; and receiving the second RF signal comprises receiving sensed information from a sensor in a low power personal area network with the system, the second RF signal communicated according to a low power wireless communication protocol.

17. The method of claim 14, further comprising:

receiving a channel assignment for the first wireless channel from an access point;

configuring the first transceiver for operation within the first wireless channel and configuring a routing path between the transceiver and the at least one segment of the selection filter via the at least one switch circuit;

determining the second wireless channel based at least in part on the first wireless channel; and configuring the second transceiver for operation within the second wireless channel and configuring a routing path between the second transceiver and the second segment of the selection filter via the second switch circuit.

18. A system comprising:

at least one integrated circuit comprising:

a first RF circuit to transmit and receive at a 2.4 GHz band according to a first wireless communication protocol;

a second RF circuit to transmit and receive at the 2.4 GHz band according to a second wireless communication protocol; and a controller coupled to the first RF circuit and the second RF circuit, the controller to configure a first routing path and a second routing path to enable concurrent transmission by the first RF circuit and reception by the second RF circuit;

a multiplexer filter to divide the 2.4 GHz band into a plurality of segments, the multiplexer filter comprising:

a first filter configured for a first channel of a first segment within the 2.4 GHz band; and a second filter configured for a second channel of a second segment within the 2.4 GHz band;

a first switch configurable by the controller to be included in the first routing path to couple the first RF circuit with the first filter to enable the concurrent transmission according to the first wireless communication protocol by the first RF circuit; and a second switch configurable by the controller to be included in the second routing path to couple the second RF circuit with the second filter to enable the concurrent reception according to the second wireless communication protocol by the second RF circuit.

19. The system of claim 18, wherein:

the second RF circuit is to receive within a second RF signal low latency information from a capture device in a wireless personal area network with the system; and the first RF circuit is to transmit a first RF signal to a remote device through an access point in a wireless local area network with the system, the first RF signal comprising at least some of the low latency information.

20. The system of claim 18, wherein the multiplexer filter further comprises a third filter configured for the second RF circuit, wherein a desired signal of the second wireless communication protocol is in a transition band between the second filter and the third filter.

* * * * *